Aug. 14, 1962 H. HEDIGER 3,049,002
DEVICE FOR MEASURING THE ROUGHNESS OF SURFACES
Filed Feb. 24, 1959 2 Sheets-Sheet 2

Inventor:
Hermann Hediger
By: Zabel, Baker, York,
Jones & Dithmar
Attorneys

United States Patent Office 3,049,002
Patented Aug. 14, 1962

3,049,002
DEVICE FOR MEASURING THE ROUGHNESS OF SURFACES
Hermann Hediger, 10 Hermannstrasse, Winterthur, Switzerland
Filed Feb. 24, 1959, Ser. No. 795,205
4 Claims. (Cl. 73—105)

The present invention relates to a device for measuring the roughness of the surfaces of machined workpieces.

Devices of this type commonly embody a tracer or feeler element whose pointed end is adapted to be moved across the surface under test and, in being thus moved, to produce electric impulses. The tracer element is electrically connected to an amplifier which serves to amplify the weak impulses produced by the tracer element so that the said impulses may be indicated by an electric indicating instrument having a graduated scale from which the magnitude of the impulses may be read. In such devices the deflection of the pointer or needle of the indicating instrument is a direct function of the magnitude of the electric impulses produced by the tracer element. The value indicated by the instrument constitutes an average value resulting from an integrating process which takes into account the higher and lower portions of the surface under test, the said value or indication being obtained by means of an electro-mechanical tracer assembly in combination with an electric indicating instrument. The interpretation of the test results in the form of the said average value has been internationally accepted.

Some of such prior art roughness testing devices operate in such a manner that the indicator readings depend to a greater or lesser extent on the velocity with which the pointed end of the tracer element is moved across the surface under test.

Although devices have been proposed in which the drive means for the tracer element are adapted to reciprocate the tracer point at a constant rate of speed along the surface of the workpiece, the fact is that the movement of the tracer point is irregular due to mechanical vibration incident to the operation of the drive mechanism and also due to vibrations or mechanical interference arising from other sources, such as outside vibration imparted to any mechanical linkage connecting the tracer element and the drive mechanism.

Furthermore, mechanical shock of sufficient magnitude will damage the crystal.

It is an object of the present invention to provide improved means for reciprocating the tracer element whereby the tracer element will be isolated from such mechanical vibrations and interference as may cause irregularity in the motion of the tracer element and damage to the crystal.

It is another object of this invention to provide a device in which the tracer element forms a part of a tracer unit which is remotely located from the drive mechanism, thus permitting the location of the tracer unit to be readily shifted or adjusted by the operator in setting up and operating the device. In other words, a number of successive readings may be taken at various points on the surface to be tested without necessitating the shifting of the main part of the apparatus which comprises the driving mechanism and the amplifying and indicating means.

According to the present invention, the foregoing objectives are achieved by providing hydraulic means for transmitting the reciprocating movement from the drive mechanism to the tracer unit, the hydraulic means including flexible tubing which has been found to be effective in isolating the tracer element from the mechanical vibrations of the drive mechanism and from mechanical interference which arises at intermediate points between the tracer unit and the drive mechanism.

A further object of the present invention is to provide means for protecting the conductor connecting the crystal with the amplifying and indicating means from mechanical and electrical interference.

The invention may be performed in various different ways but one particular embodiment thereof will now be described by way of example with reference to the accompanying drawings, in which.

Figure 1:
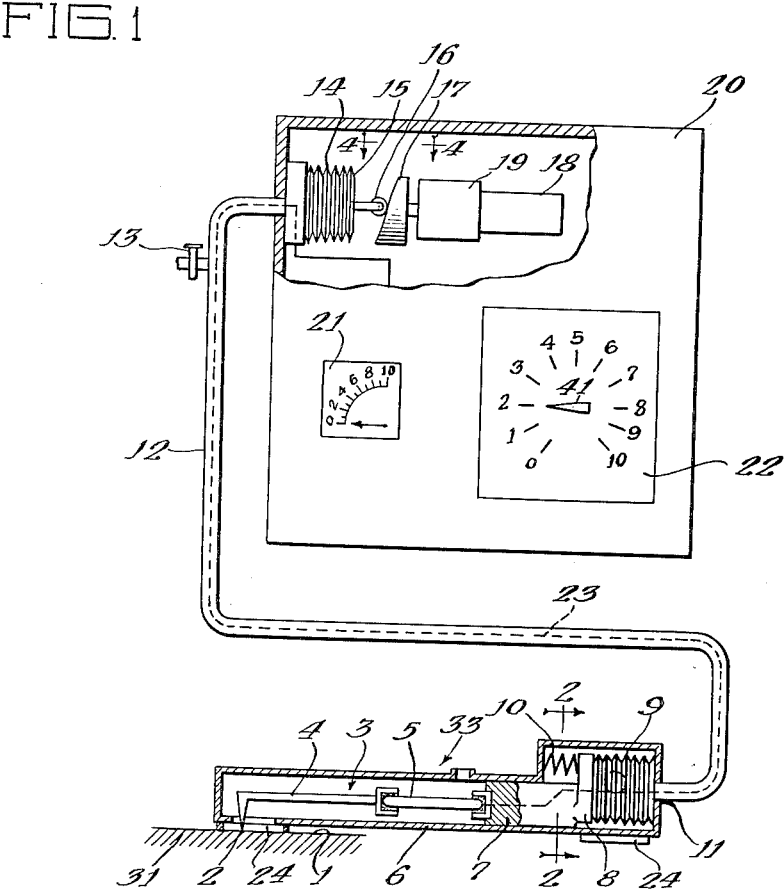
FIG. 1 is a diagrammatic representation of the device of the invention.

With reference now to FIG. 1, the device comprises a tracer unit 33 and a remotely located housing 20 in which the drive mechanism is disposed. Flexible tubing 12 connects the two. The tracer unit is adapted to rest on the surface 1 of a workpiece 31, and includes one or more suitable supporting members 24 for this purpose.

The tracer unit 33 comprises a housing 6 and a tracer element 3 disposed within the housing for reciprocating movement. The tracer element 3 comprises a tracer point 2, a carrier 4, a crystal 5, and a slide member 7. The rear end of the carrier 4 and the front end of the slide member 7 are shaped to engage the ends of the piezo-electric crystal 5 so that the carrier 4 and tracer point 2 are supported by the crystal. The tracer point extends through a suitable opening in the housing 6 so that it may engage the surface 1. Thus vertical movement of the tracer point 2 will produce a voltage in the crystal.

The slide member 7 is slidably mounted on a reduced front portion of the housing 6 and is connected at its rear end to a plate member 8 which constitutes the movable wall of an expansible cylinder 9. As shown, the expansible cylinder 9 is preferably in the form of a bellows having a corrugated flexible peripheral wall.

Figure 2:
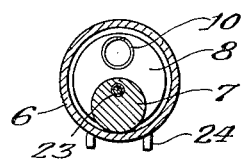
FIG. 2 is a cross section along the lines 2—2 of FIG. 1.

A compression spring 10 is arranged in such a manner that one end thereof abuts the plate member 8, while its other end rests against the inside of the housing 6 as will also be seen in FIG. 2.

The fixed end of the flexible container or bellows 9, which is at the opposite end from the plate member 8, is connected at 11 to the flexible tube 12. The tube 12 is provided with a filler neck 13 which is fitted with a shut-off cock. The interior of the flexible tube is in communication with an expansible cylinder 14 also in the form of a bellows and located in the housing 20. The free end of the bellows 14 comprises a plate 15 which supports a cam roller 16 which latter is urged into contact with a cam member 17 by the transmitted force of the spring 10.

The drive mechanism comprises a small motor 18 which is provided with a reduction gearbox 19. The disc-shaped cam member 17 is mounted on the end of the output shaft of the reduction gearbox 19. The cam disc 17, during each full revolution, moves the cam roller 16 through one cycle of reciprocating movement which occurs at a uniform speed in either direction along a path of predetermined length.

Figure 3:
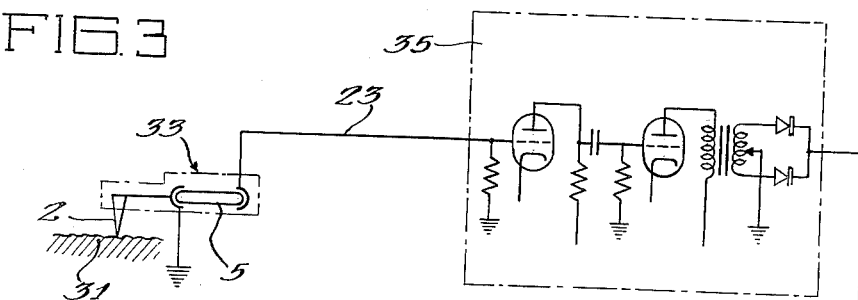
FIG. 3 is a schematic wiring diagram of the device of the invention.
Figure 3:
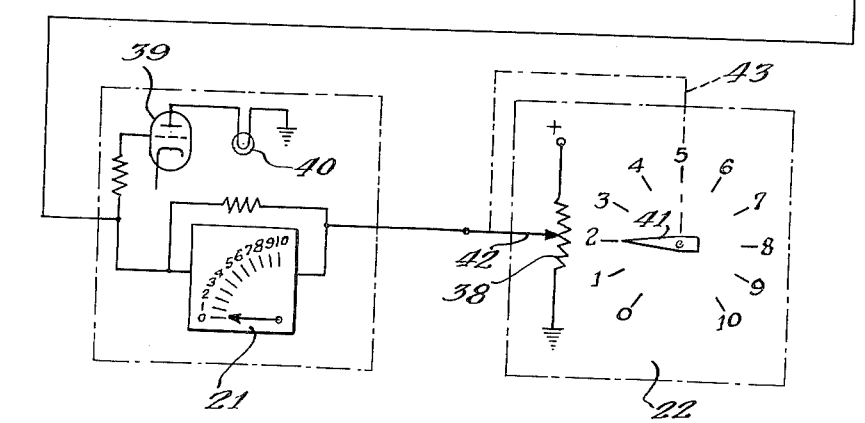
Figure 4:
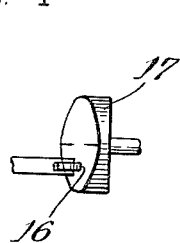
FIG. 4 is a detailed view taken along the line 4—4 of FIG. 1.

The expansible cylinders 9 and 14 together with the tube 12 which connects the same are filled with a suitable liquid to provide hydraulic transmitting means for transmitting the reciprocating movement of the cam roller 16 to the tracer point 2. The motor 18, the reduction gearbox 19 and the cam disc 17 as well as the expansible cylinder 14 with its associated plate 15 and cam roller 16 are accommodated in the housing 20 which also contains an indicating instrument 21 and a compensator unit 22. A flexible conductor 23 connects the crystal 5 to an amplifier 35 (FIG. 3) which is also located within the housing 20. The intermediate portion of the conductor 23 is located within the flexible tube 12 so that it will be protected from damage.

Figure 5:
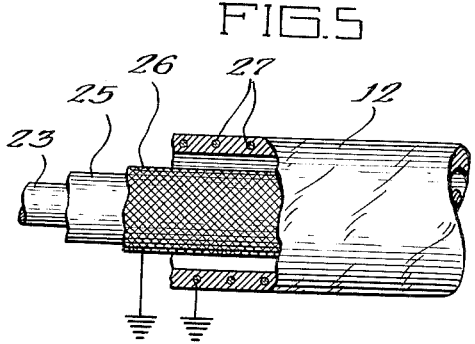
FIG. 5 is an enlarged view of the tubing and the conductor disposed therein.

The construction of the conductor and tubing is shown in FIG. 5. The conductor 23 is provided with a suitable insulating jacket 25, and the insulated jacket is surrounded by a tubular copper mesh 26 which serves to shield the conductor 23. A thin film of the oil of the hydraulic system exists between the insulating jacket 25 and the tubular mesh 26. The assembly 23, 25, 26 is flexible so that it will not interfere with the flexibility of the tube 12. The tube 12 may be reinforced with a coil of steel wire 27 which also exerts an electrical shielding effect on the conductor 23. The shielding mesh 26 and the reinforcing wire 27 may be suitably grounded as indicated in FIG. 5.

For the purpose of testing the roughness of a given surface of a workpiece the supporting members 24 are place in position on the surface 1 under test, the motor 18 and the amplifier being energized. The motor 18, through the medium of the cam disc 17 and the hydraulic transmission means 9, 12, 14, reciprocates the tracer point 2. The operation of the aforedescribed device will now be described in greater detail with reference to FIG. 3.

The tracer point 2 consists of a diamond having an accuartely defined radius at its free end and an accurately defined angle. The movements of the tracer point 2 in contact with the surface 1 are transmitted to the crystal 5, thus producing electric impulses in the crystal, these impulses being amplified by the amplifier 35 and then rectified. The indicating instrument 21 indicates the average magnitude of the impulses which are proportional to the deflections of the tracer point. The compensator unit 22 comprises a potentiometer 38 which may be used to supply a voltage which is in opposition to the output voltage of the amplifier 35. Adjustment of the potentiometer 38 makes it possible to zero the needle of the indicating instrument 21.

The potentiometer 38 includes a sliding contact 42 which is ganged at 43 to the pointer 41 of the compensator so that manual adjustment of the pointer 41 controls the position of the sliding contact 42. If, before the testing is begun, the pointer of the compensator 22 is set at the specified surface roughness value, the needle of the indicator 21 will not be deflected as long as the actual roughness of the surface under test is equal to or less than the specified value. If, however, the surface roughness exceeds the specified value, the indicator 21 will give an indication showing the amount by which the specified maximum roughness is exceeded. Also connected to the indicating instrument 21 is an electronic relay 39 which is adapted to energize a pilot lamp 40 upon the indicator 21 being energized. This electronic relay 39 will respond to voltage peaks of short duration, while the more sluggish indicator 21 may not respond to such voltage peaks.

The provision of hydraulic transmission means between the drive mechanism 18—19 in the housing 20 and the tracer point makes it possible to protect the crystal from any mechanical or electrical interference that might be caused by the drive mechanism. The fact that the electric conductor 23 is disposed within the liquid filled tube 12 of the hydraulic transmission means provides adequate protection of the conductor against injury and facilitates the use of the device in conducting roughness tests.

It will be understood that modifications and variations may be effected without departing from the spirit and scope of the novel concepts of the present invention, but it is understood that this application is to be limited only by the scope of the appended claims.

I claim:

1. A device for measuring the roughness of surfaces comprising a tracer unit adapted to be placed on the surface the roughness of which is to be measured, and remotely located drive mechanism therefor, said tracer unit comprising a housing and a tracer element mounted within said housing for reciprocating movement, said tracer element having a tracer point extending through the housing for contact with said surface, and including crystal means for producing electric impulses responsive to the roughness of said surface as said tracer point moves over said surface, hydraulic transmission means connecting said drive mechanism and said tracer unit whereby the reciprocating motion of said drive mechanism may be transmitted to said tracer element, said hydraulic transmission means including flexible tubing extending between said tracer unit and said drive mechanism to facilitate the location of said tracer unit on said surface and to isolate said tracer unit from mechanical interference, and means for amplifying and indicating said electric impulses.

2. A device as claimed in claim 1 wherein said hydraulic transmission means includes expansible cylinders in the form of bellows.

3. A device as claimed in claim 1 wherein said amplifying and indicating means are located adjacent said drive mechanism, and having an electric conductor connecting said crystal means with said amplifying and indicating means, said electric conductor being disposed within said flexible tubing and being mechanically shielded thereby.

4. A device as claimed in claim 3 in which said conductor is provided with electrical shielding means.

References Cited in the file of this patent

UNITED STATES PATENTS

| | | |
|---|---|---|
| 2,384,435 | Bodine | Sept. 11, 1945 |
| 2,404,143 | Reason | July 16, 1946 |
| 2,474,015 | Shaw | June 21, 1949 |
| 2,534,943 | Bergeson | Dec. 19, 1950 |
| 2,615,438 | Tucker | Oct. 29, 1952 |
| 2,733,598 | Miner | Feb. 7, 1956 |